(12) United States Patent
Bau' et al.

(10) Patent No.: US 7,200,307 B2
(45) Date of Patent: Apr. 3, 2007

(54) HIGH COUNT TELECOMMUNICATION OPTICAL CABLE WITH CONTROLLED FIBER LENGTH METHOD AND APPARATUS FOR MANUFACTURING THE SAME

(75) Inventors: Fabio Bau', Cassano Magnago (IT); Alessandro Ginocchio, Sesto San Giovanni (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/537,337

(22) PCT Filed: Dec. 3, 2002

(86) PCT No.: PCT/EP02/13682

§ 371 (c)(1),
(2), (4) Date: Nov. 23, 2005

(87) PCT Pub. No.: WO2004/051336

PCT Pub. Date: Jun. 17, 2004

(65) Prior Publication Data

US 2006/0147164 A1  Jul. 6, 2006

(51) Int. Cl.
*G02B 6/44* (2006.01)
*B29D 11/00* (2006.01)
*B23P 25/00* (2006.01)

(52) U.S. Cl. .............. 385/111; 385/100; 385/109; 385/110; 385/112; 264/1.28; 264/1.29; 29/458; 29/572.2

(58) Field of Classification Search ........... 385/109, 385/110, 111, 112, 113, 100; 264/1.28, 1.29; 29/458, 572.2
See application file for complete search history.

(56) References Cited

U.S. PATENT DOCUMENTS

| | | | | |
|---|---|---|---|---|
| 4,640,576 A | * | 2/1987 | Eastwood et al. | 226/7 |
| 4,773,207 A | | 9/1988 | Cramer | 57/294 |
| 4,983,333 A | * | 1/1991 | Blew | 264/1.25 |
| 5,155,789 A | | 10/1992 | Le Noane et al. | 385/106 |
| 5,263,239 A | * | 11/1993 | Ziemek | 29/458 |
| 5,703,984 A | * | 12/1997 | Carratt et al. | 385/106 |
| 5,999,677 A | | 12/1999 | Moncisvais et al. | |
| 6,205,277 B1 | | 3/2001 | Mathis et al. | 385/106 |
| 6,853,780 B1 | * | 2/2005 | Brandi et al. | 385/104 |
| 2003/0202758 A1 | * | 10/2003 | Ardouin | 385/111 |
| 2005/0244115 A1 | * | 11/2005 | Bocanegra et al. | 385/110 |

FOREIGN PATENT DOCUMENTS

| | | | | |
|---|---|---|---|---|
| EP | 0 793 127 A1 | 9/1997 | | 385/100 X |
| EP | 1 081 519 A1 | 3/2001 | | 385/100 X |
| WO | WO 00/58768 | 10/2000 | | 385/100 X |

OTHER PUBLICATIONS

Pastuszka, et al., "A New Type of High Fiber Count, Low Dimension Optical Cable with Simplified Installation Characteristics", International Wire & Cable Symposium Proceedings, XP-001069379, pp. 106-111, (1999).

* cited by examiner

*Primary Examiner*—Brian M. Healy
(74) *Attorney, Agent, or Firm*—Finnegan, Henderson, Farabow, Garrett & Dunner, L.L.P.

(57) ABSTRACT

A telecommunication optical cable has a number of optical fibers; at least a microsheath loosely containing the optical fibers, the at least one microsheath loosely containing the optical fibers therein forming at least one corresponding microbundle, wherein the optical fibers are stranded according to an open helix trajectory.

27 Claims, 6 Drawing Sheets

HIGH COUNT TELECOMMUNICATION OPTICAL CABLE WITH CONTROLLED FIBER LENGTH METHOD AND APPARATUS FOR MANUFACTURING THE SAME

CROSS REFERENCE TO RELATED APPLICATIONS

This application is a national phase application based on PCT/EP2002/013682, filed Dec. 3, 2002, the content of which is incorporated herein by reference.

BACKGROUND OF THE INVENTION

1. Field of the Invention

The present invention relates to telecommunication optical cables and in particular it relates to an optical telecommunication cable having a controlled fiber length. The present invention further relates to a method and an apparatus for manufacturing such a controlled fiber length optical cable.

2. Description of the Related Art

Several different telecommunication optical cables are known in the art. A widely used type of optical cable is the so-called Multi Loose Tube (MLT) cable, an example of which is described in U.S. Pat. No. 5,999,677. A typical MLT cable comprises: a central strength member; a number of tubes containing loosely placed optical fibers; a mechanical reinforcing layer, for example a thread made of glass or of an aramid material arranged around the tubes; and a protective outer sheath. The tubes containing the optical fibers are typically stranded around the central tube according to a unidirectional helix or a bidirectional helix.

In the description that follows, use will be made indistinctly of the terms "bidirectional helix", "open helix" or "SZ helix" to signify a trajectory along a cylindrical surface resulting from the combination of the translatory movement in a direction parallel to a central axis with an alternate rotary movement about the axis itself. Basically, this type of trajectory is different from a "unidirectional" or "closed" helix trajectory since the winding around the central axis is not always performed in the same direction, but alternately in a clockwise direction and anti-clockwise direction.

As said above, in a known MLT cable, a number of optical fibers are arranged within a tube in a loose manner, namely the fibers are not tightly constrained within the tubes.

The central rod operates as an antibuckling element. It is characterized by a low thermal expansion coefficient and is made of a material having a rather low modulus of elasticity. The yarns of aramid material or glass form reinforcement against traction forces but they provide no substantial resistance to axial compression forces applied to the cable.

Generally, both the external sheath and the tubes are made of a plastic material and give a low contribution to the traction resistance of the whole optical cable.

An important technical requirement for an optical cable is that it should be able to resist to lay pulling, namely the traction force applied during the step of laying the cable, thus limiting its elongation. In addition to such a characteristic, the length of an optical cable should not be affected by thermal changes, due for instance to environmental temperatures changes (night, day, winter, summer, . . . ), so that the fibers contained therein do not become stressed. In other words, it is highly desirable that optical cable contractions due to temperature changes are particularly reduced.

Typically, a MLT cable, as soon as it becomes subjected to a temperature reduction, tends to contract. It is known that the optical fibers do not experience the same contraction and tend to become bent. In fact, as a consequence of the cable contraction, the optical fibers may come into contact with the inner wall of the tube where they are placed and form fundamentally random bendings.

The generated fiber optic bendings could be divided into microbendings and macrobendings but, in any case, they originate unwanted optical attenuation increases.

In addition to the above problems of the known Multi Loose Tube optical cables, a further disadvantage of such an optical cable category lies in the size. In other words, mainly because of the presence of the central rod, and due to the fact that the fibers are loose within the tubes, the diameter of such MLT optical cables is rather high. A high diameter optical cable is undesirable both for installation and production reasons (high costs, disadvantageous installation, bulky winding bobbin).

A further disadvantage of the known Multi Loose Tube optical cables is that the tube are made of a material which is rather tough such as, for instance, high density polythene or polybutylene therephtalate. This results in the need to use a special tool for removing or stripping the tubes. In other words, a technical person desiring to strip the tube should use a tool and can not operate by using his hands only.

In view of the above inconveniences, with the aim to solve the above problems of the known MLT optical cables, it has been designed a new type of telecommunication optical cable, known as "microbundle optical cable".

A microbundle optical cable is known, for instance, from WO00/58768 and comprises a number of microbundles, an inner tube circling the microbundles and an external sheath (made, for example, of polyethylene or the like) covering the inner tube.

Two or more reinforcing rods, for example made of glass reinforced plastic, are typically arranged in the external sheath. The external sheath may further comprise ripcords. Optionally, a wrapping tape, made of paper for instance, may be placed between the external sheath inner wall and the inner tube external wall for forming a thermal barrier and for decoupling purposes.

In turn, each microbundle of the microbundle optical cable typically comprises a microsheath and a number of optical fibers arranged parallel to each other within the microsheath.

With respect to the tubes used in the MLT optical cables previously described, the microsheaths of the microbundle optical cables are typically smaller and thinner. For example, in a typical MLT optical cable, a tube containing twelve optical fibers has an inner diameter comprised-between about 1.6 mm and 1.8 mm, an external diameter comprised between about 2.2 mm and 2.8 mm and a thickness comprised between 0.3 mm and 0.5 mm, while in a typical microbundle optical cable a microsheath containing the same number of optical fibers (twelve) has an inner diameter of about 1.1 mm, an external diameter of about 1.4 mm and a thickness of about 0.15 mm.

The microsheath is typically made of a material having a reduced modulus of elasticity and a low ultimate elongation, such as PVC. Advantageously, the use of the above material for forming a thin microsheath also results in a microsheath that is easier to remove or to strip, just using fingers or fingernails.

In the optical cable according to WO/58768, the optical fibers are rectilinearly arranged inside the microsheath, while the microbundles may be rectilinearly arranged or S-Z stranded.

A microbundle optical cable fundamentally is advantageous with respect to a MLT optical cable, as said above, because its size and weight are considerably reduced.

Notwithstanding the above advantages, it has been found that a known microbundle optical cable still has considerable and highly undesirable optical attenuation problems.

Several tests and experimentations have been conducted by the Applicant with the aim to discover the reason of such optical attenuation problems. The Applicant has observed that, whenever one of the microbundles or the inner tube transits on a cylindrical surface, such as during the winding or unwinding step, a not negligible movement of the optical fibers or the microbundles was taking place. In particular, some of the optical fibers or microbundles remain straight, while some others tend to ripple.

According to the Applicant, this is mainly due to the fact that the optical fibers lay on different positions within a microbundle. During manufacturing, the just formed microbundle is wound on a capstan pulley that provides the required traction force. When the microbundle leaves the pulley, the optical fibers that were positioned closer to the pulley's center result to be shorter than the optical fibers that were positioned more peripherally. The length difference can be of the order of one or more ‰. Thus the fibers don't have an equalized length. This fact results in that, at the exit of the capstan, there are straight fibers and rippled fibers.

A similar problem occurs when the inner tube is manufactured starting from the microbundles, if the microbundles are provided straight (i.e. parallel to each other). Again, passage of the inner tube on the circular surface of a capstan results in a different length of the microbundles within the inner tube, which different length is related to the different distance of the microbundles from the center of the capstan pulley. The groups of fibers contained in the different microbundles will show a corresponding length difference.

Thus, the Applicant has realized that the relatively high optical attenuation of a typical microbundle optical cable is caused by a too high variation of the optical fiber length.

The Applicant has verified that, for a microbundle optical cable comprising twelve microbundles, each containing twelve optical fibers, microbundles with a difference of fiber length in the average of about 0.3% and inner tubes with a difference of microbundle length in the average of 0.4% are produced.

These length differences result in microbending and/or macrobending problems that will negatively affect the cable attenuation performances.

The Applicant observes that the problems previously addressed, in particular that of a length difference between the fibers contained in a same microbundle, is characteristic of loose optical cables which, as previously stated, differ from tight cables in that the fibers are loosely contained in the surrounding sheath.

A tight cable is for example described in U.S. Pat. No. 5,155,789. The disclosed cable comprises a series of optical fibers, the fibers being split into modules each of which is enveloped by a thin supporting sheath that easily torn, the sheaths being in contact with the optical fibers, and a protective covering being in contact with the supporting sheath. The fibers within a supporting sheath and the modules within the covering may be assembled without twisting, or with twisting at a continuous pitch or at an alternating pitch.

According to the Applicant, when a tight cable as described in U.S. Pat. No. 5,155,789 is wound on a capstan, the outer optical fibers, due to the friction between the optical fibers and the sheath, tend to resiliently stretch. When the sheath becomes straight again, after leaving the capstan, the optical fibers return in their original state. It is known that typical optical fibers are able to elastically resist to the elongations experienced during winding on the capstan. In other words, during the manufacturing of a tight cable, the optical fibers thereof do not experience, according to the Applicant, any permanent length difference.

SUMMARY OF THE INVENTION

An object of the present invention is providing a telecommunication loose microbundle optical cable having an equalized/controlled fiber length variation and, therefore, having a controlled optical attenuation. High thermal stability and reduced size are further desired characteristics.

A further object of the present invention is providing an apparatus for manufacturing a telecommunication loose microbundle optical cable having the said characteristics.

A further object of the present invention is providing a method for manufacturing a telecommunication loose microbundle optical cable having the said characteristics.

The Applicant has found that, by arranging in open helix the fibers inside the microbundles of a loose microbundles optical cable, the resulting cable has an equalized/controlled fiber length variation, a controlled optical attenuation, a high thermal stability and a reduced size. The loose cable according to the present invention shows the same minimized length difference in any spans thereof.

In particular, the Applicant has verified that by arranging the fibers according to an open helix inside the microbundle it is possible to obtain a length difference lower than 0.035% of these fibers.

In a preferred embodiment, also the microbundles are arranged according to an open helix, so that the different microbundles, and the corresponding groups of fibers, substantially have the same length within the cable.

According to a first aspect thereof, the invention provides a telecommunication optical cable comprising: a plurality of microbundles, each microbundle comprising a plurality of optical fibers and a microsheath loosely containing said plurality of optical fibers; and a tubular member containing said plurality of microbundles, and is characterized in that said plurality of optical fibers are stranded according to an open helix trajectory.

Advantageously, the microbundles are stranded according to an open helix trajectory.

Advantageously, the cable comprises a binder for binding together the microbundles. Profitably, the binder comprises at least a tape wound around the microbundles.

Advantageously, the optical fiber open helix trajectory has a lay length, the fiber lay length being preferably ≦ about 4.0 m, more preferably ≦ about 2.0 m.

Advantageously, the microsheath is made of a material selected from the group consisting of: PVC, ethylene/vinyl acetate copolymer, polyethylene; a mixture of PVC, ethylene/vinyl acetate copolymer or polyethylene with an inorganic filler; any mixture of PVC, ethylene/vinyl acetate copolymer and polyethylene; and any mixture of PVC, ethylene/vinyl acetate copolymer and polyethylene, with the addition of an inorganic filler.

Advantageously, at least one of said microbundles comprises twelve optical fibers and the corresponding microsheath has an inner diameter comprised between about 1 mm and 1.2 mm and an outer diameter comprised between about 1.3 mm and 1.5 mm.

Advantageously, at least one of said microsheaths has a thickness comprised between about 0.05 mm and 0.3 mm.

Advantageously, the tubular member is made of a material selected from the group consisting of medium density polyethylene, high density polyethylene, polypropylene, and any mixtures thereof.

Advantageously, the cable further comprises an outer sheath surrounding said tubular member.

Advantageously, said cable comprises at least a peripheral reinforcing member.

Advantageously, the maximum difference of length between the optical fibers within each of said microbundles is lower than about 0.1%.

According to a different aspect thereof, the present invention relates to an apparatus for manufacturing a telecommunication optical cable comprising: an optical fiber pay-off stand suitable for unwinding a plurality of optical fibers; an extrusion device for extruding, around said plurality of optical fibers, a microsheath loosely containing said plurality of optical fibers to form a microbundle; wherein the apparatus comprises a fiber oscillating device between the fiber pay-off stand and the extrusion device, for SZ oscillating the fibers before entrance into the extrusion device, and a fiber guide member placed before the fiber oscillating device, for properly arranging the optical fibers in a predetermined configuration.

Advantageously, the apparatus further comprises a microbundle pay-off stand suitable for unwinding a plurality of microbundles formed as said microbundle, a further extrusion device for extruding, around said plurality of microbundles, a tubular member containing said plurality of microbundles; and a microbundle oscillating device positioned between the microbundle pay-off stand and the further extrusion device, for SZ oscillating the microbundles before entrance into the further extrusion device.

Advantageously, the apparatus further comprises a binder section for binding the microbundles in order to form a bundle of microbundles. Profitably, the binder section comprises a stranding device for stranding a ribbon around said microbundles.

Advantageously, said fiber guide member is a holed lay plate.

Advantageously, the apparatus further comprises a holed lay plate for properly arranging the microbundles in a predetermined configuration, the holed lay plate being placed before the microbundles oscillating device.

Advantageously, said extrusion device comprises an extrusion head, the distance between the fiber oscillating device and the extrusion head being comprised between about 280 mm and 550 mm.

Advantageously, the fiber and microbundle oscillating devices comprise a plate with holes, the hole centers being on at least two concentric circles.

According to a different aspect thereof, the present invention relates to a method for manufacturing a telecommunication optical cable, comprising: advancing a plurality of optical fibers in a first spatial arrangement; rearranging the plurality optical fibers from the first spatial arrangement into a second spatial arrangement; stranding SZ the plurality of optical fibers in the second spatial arrangement; and extruding a microsheath around the SZ stranded optical fibers so as to form a loose microbundle.

Advantageously, the method comprises the step of stranding SZ the loose microbundle with at least a further microbundle.

Advantageously, the method further comprises binding together the microbundles and the at least a further microbundle in order to form a bundle of microbundles.

Advantageously, the step of SZ stranding the optical fibers comprises inverting the stranding direction with a pitch lower than about 4.0 m. Profitably, said pitch is lower than about 2.0 m.

Advantageously, the step of SZ stranding the optical fibers comprises rotating a fiber guiding holed plate by an angle in the range between 280° and 330°.

BRIEF DESCRIPTION OF THE DRAWINGS

The present invention will become fully clear from the detailed description of several embodiments thereof, given by way of non limiting example and to be read with reference to the attached figures wherein.

DETAILED DESCRIPTION OF THE INVENTION

Figure 1:
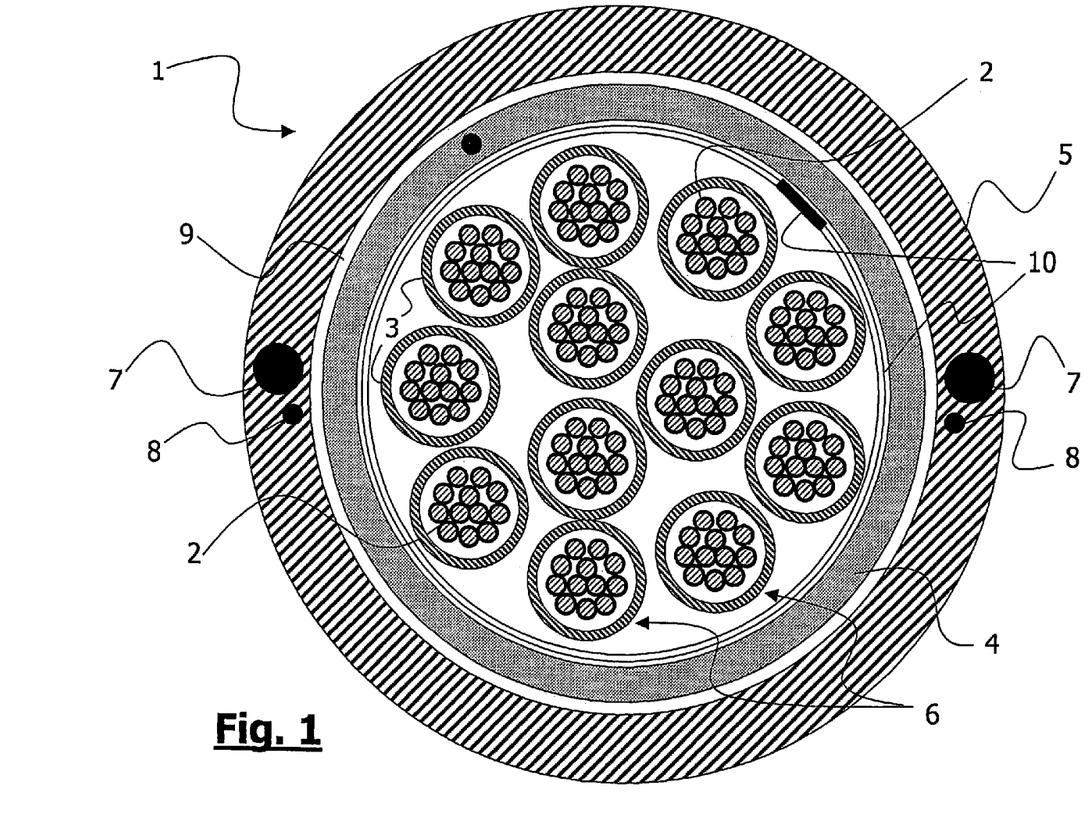
FIG. 1 is an enlarged transversal sectional view of a possible embodiment of cable according to the present invention.

FIG. 1 is a transversal sectional view of a possible embodiment of a loose microbundle optical cable 1 according to the present invention. It should be remarked that the shown configuration, especially as far as the number of optical fibers and microbundles are concerned, is purely exemplifying.

The optical cable 1 comprises a plurality of optical fibers 2, a plurality of microsheaths (or minisheaths) 3, an inner tube 4 and an outer sheath (or external tube) 5. Alternatively, the inner tube 4 can be omitted and the outer tubular sheath 5 can carry out the twofold function of an outer protective sheath and an inner tube. In addition, this outer sheath could be of elliptic cross section or can have several reinforcing ribs, for example two or four opposing ribs, in some of which the reinforcing members are inserted. This embodiment is described, for example, in EP0,793,127. In relation to specific requirements, further protective layers, for example metal or polymer layers, can also be present, both inside and outside the structure described.

Figure 2:
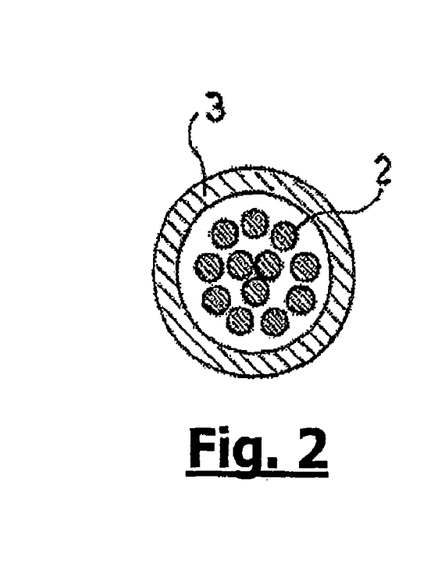
FIG. 2 is a transversal sectional view of a microbundle of the cable of FIG. 1.
Figure 5:
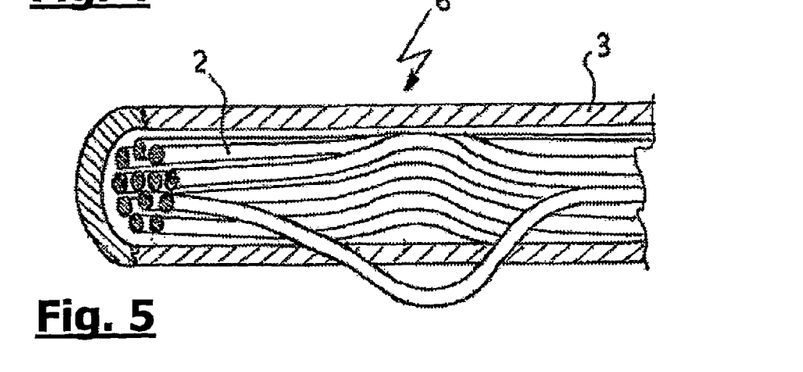
FIG. 5 shows a partial longitudinal sectional view of a microbundle according to the present invention.
Figure 9:
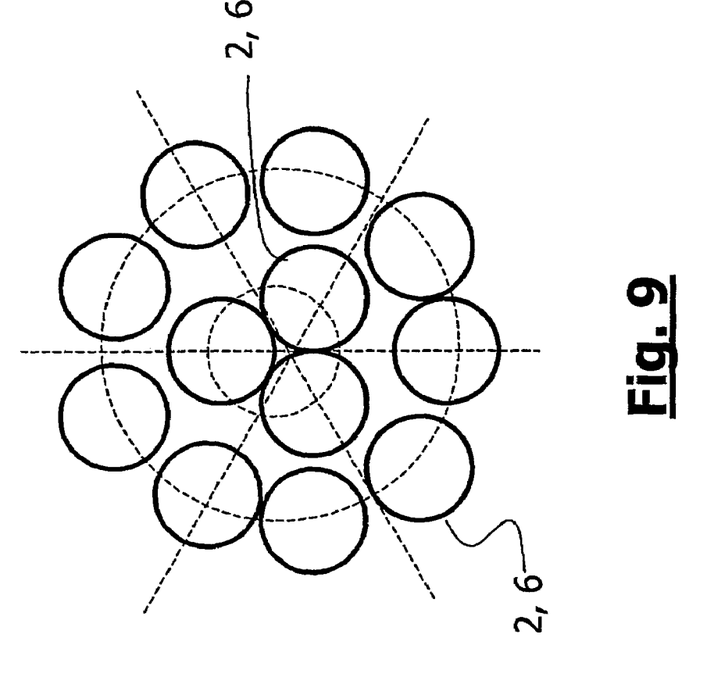
FIG. 9 shows the hole arrangement in a fiber/microbundle guiding member that is part of the apparatuses of FIGS. 6-8 for providing a corresponding arrangement of the fibers/microbundles during manufacturing.

In the embodiment of FIGS. 1, 2 and 5, twelve optical fibers 2 are arranged within a single microsheath 3 so that a proper array is formed. The array is shown in FIG. 9. The fiber array is such that three first optical fibers are arranged with their centers placed at equispaced positions along a first inner circumference and nine further optical fibers are arranged with their centers placed at equispaced positions along a second outer circumference. The first and second circumferences are concentric. It has to be remarked that the arrangement here described is created when the group of fibers is assembled to be placed in the microsheath, but this order may be lost during successive manufacturing steps or during cable handling.

A uniform optical fiber distribution (by SZ stranding) without localized cross-over reduces the side pressure acting on the fibers and the effects of temperature variation are therefore minimized without attenuation increases. In the event of localized cross-over between adjacent fibers, microbending and macrobending with higher side pressure may occur, giving rise to attenuation increase.

Each microsheath 3 and the optical fibers 2 contained therein form a microbundle (or minibundle) 6 which is shown in FIGS. 1, 2 and 5. In the present embodiment, twelve microbundles 6 are properly arranged within the inner tube 4 so that an array is formed. The microbundle array is similar to the fiber array shown in FIG. 9 and comprises three central microbundles and nine further microbundles circling the central ones at equispaced position. Thus, the total number of optical fibers 2 in the considered optical cable is 144.

According to the present invention, the optical fibers 2 are loosely arranged within the respective microbundle 6. Thus, it should be understood that FIG. 1 shows a cross section of a cable "in use" wherein the fibers and the microbundles, being loose, have moved with respect to the above described arrangement.

The space within each microbundle 6 not occupied by the fibers 2 may be filled with an oil or grease-like material (oil-filled microbundles), or may contain dry material such as talc or the like (dry microbundles).

According to a preferred embodiment of optical cable according to the present invention, the optical fibers 2 within a single microsheath 3 are differently colored with the purpose of an easier identification thereof by an operator.

Each of the microsheaths 3 is preferably made of a material selected from the group consisting of PVC, ethylene/vinyl acetate copolymer, polyethylene; a mixture of PVC, ethylene/vinyl acetate copolymer or polyethylene with an inorganic filler; any mixture of PVC, ethylene/vinyl acetate copolymer and polyethylene; and any mixture of PVC, ethylene/vinyl acetate copolymer and polyethylene, with the addition of an inorganic filler. The microsheath 3 have a thickness preferably comprised between 0.05 mm and 0.3 mm, more preferably comprised between 0.05 mm and 0.2 mm, and an inner diameter that depends on the number of fibers contained therein. Preferably, in a twelve-fibers microbundle 6, the microsheath has an inner diameter comprised between about 1 mm and 1.2 mm and an outer diameter comprised between about 1.3 mm and 1.5 mm. In a possible realization of a twelve-fibers microbundle 6, the internal diameter may be about 1.1 mm and the outer diameter about 1.4 mm.

According to a profitable embodiment of the present invention, each microsheath 3 is of a different color in order to facilitate the identification thereof by an operator.

The inner tube 4 is preferably made of MDPE (medium density polyethylene), HDPE (high density polyethylene) or PP (polypropylene) or any mixture thereof. Possible values of the inner and outer diameter of the inner tube 4 of a 144-fibers cable are 6.4 mm and 8.4 mm, respectively.

Preferably, the outer sheath 5 is made of MDPE (medium density polyethylene), HDPE (high density polyethylene) or PP (polypropylene) or any mixture thereof. Possible values of the inner and outer diameter of the inner tube 4 of a 144-fibers cable are 8.6 mm and 13.3 mm, respectively.

Profitably, the optical cable according to the present invention comprises reinforcing rods 7, made for instance of glass reinforced plastic or steel, embedded in the outer sheath 5. In the embodiment of FIG. 1, two rods 7 are shown but it should be understood that the number of rods 7 could change without affecting the scope of the present invention. The rods 7 are not shown in the sectional view of FIGS. 3 and 4. The reinforcing rods 7 may have a diameter of, for instance, about 1.6 mm.

Figure 3:
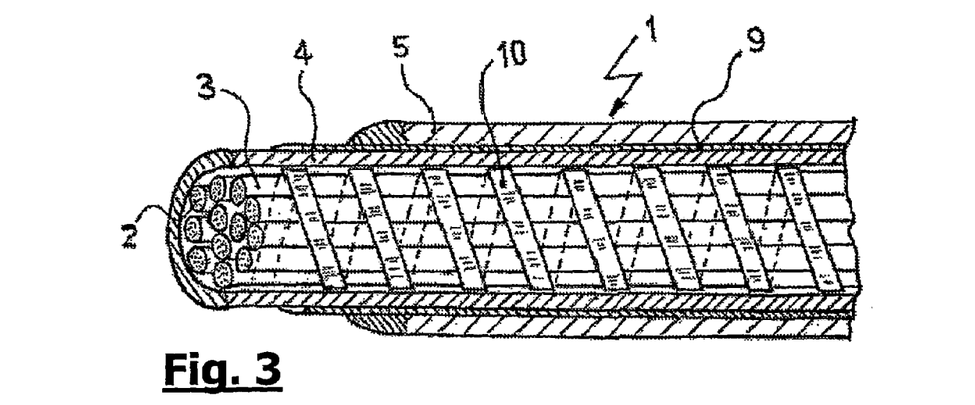
FIG. 3 shows a partial longitudinal sectional view of a cable according to the present invention, wherein the microbundles are straight.
Figure 4:
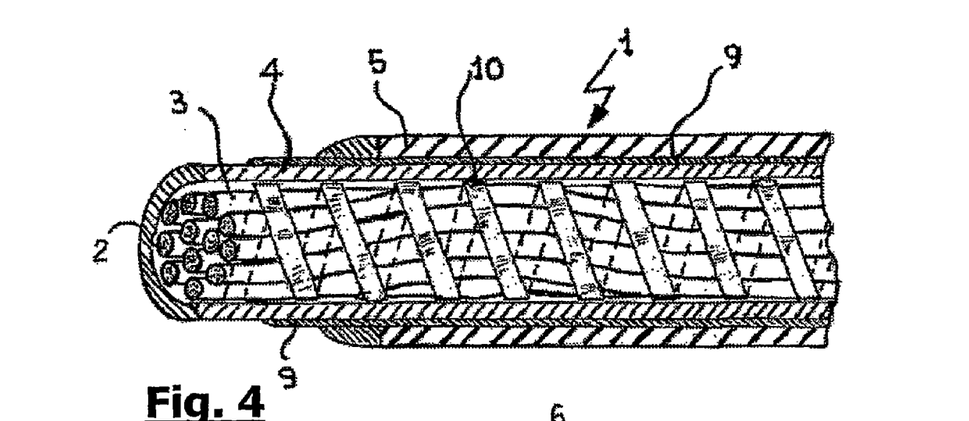
FIG. 4 shows a partial longitudinal sectional view of a cable according to the present invention, wherein the microbundles are SZ stranded.

Analogously, the optical cable 1 further optionally comprises ripcords 8 (not shown in FIGS. 3 and 4). Optionally, a wrapping tape 9, for instance made of paper or the like, is placed between the inner tube 4 and the outer sheath 5. The optional wrapping tape 9 may be about 0.09 mm thick and about 32 mm large.

In addition or alternatively to rods 7, it is possible to use a reinforcing layer arranged around the inner tube, for example a thread made of glass or of an aramid material. Such thread may replace the wrapping tape 9.

In view of the fact that the microsheaths are rather thin and are made of a material with rather low mechanical characteristics (low break load ($\leq 4.5$ Mpa) and low elongation at break ($\leq 100\%$)), profitably they can be easily stripped by an operator/installer.

Thus, the telecommunication optical cable according to the present invention is a microbundle optical cable. In the optical cable according to the prior art, the optical fibers are in general rectilinearly arranged inside the microsheath, while the microbundles may be rectilinearly arranged or S-Z stranded.

According to the present invention the optical fibers 2 are SZ stranded (i.e. are stranded together so that each fiber defines an open helix) inside a loose microbundle. As shown in the examples described in the following, such a stranding allows obtaining a fiber length difference within each microbundle lower than 0.1% and, by an appropriate choice of the stranding parameters, even lower than 0.03%.

Better performances, as it will become clear below, are obtained when both the optical fibers 2 and the microbundles 6 are SZ stranded.

Along the S-Z trajectory of the fibers 2 or of the microbundles 6, the direction of winding is inverted, in either direction, upon reaching a predetermined winding angle, preferably ranging from 280° to 330°, more preferably between 300° and 330°. The S-Z trajectory has, associated therewith, an inversion pitch, also referred to as "lay length" in the following, defined as being the distance between two successive points where there is an inversion in the direction of rotation. The inversion pitch (lay length) of the SZ fibers strand is preferably between 0.5 m and 5 m and the inversion pitch of the SZ microbundles strand is preferably between 1 m and 5 m, more preferably between 1 m and 3 m.

Additional good performances, especially in terms of improved resistance to buckling, are obtained when the microbundles are bounded together. It has been discovered that a convenient manner to bound the microbundles together is through a rather narrow tape (or ribbon) 10 (clearly shown in FIGS. 3 and 4), which is wound around the microbundles so that a bundle of microbundles is formed. Preferably, the binding ribbon 10 is wound according to a closed helix. The tape 10 may be, for example, about 2.5 mm wide.

In alternative or in addition to this preferred manner to discontinuously binding the microbundles 6, other means for binding together the microbundles 6 may be used, such as yarns, glues or thermal binding.

Figure 6:
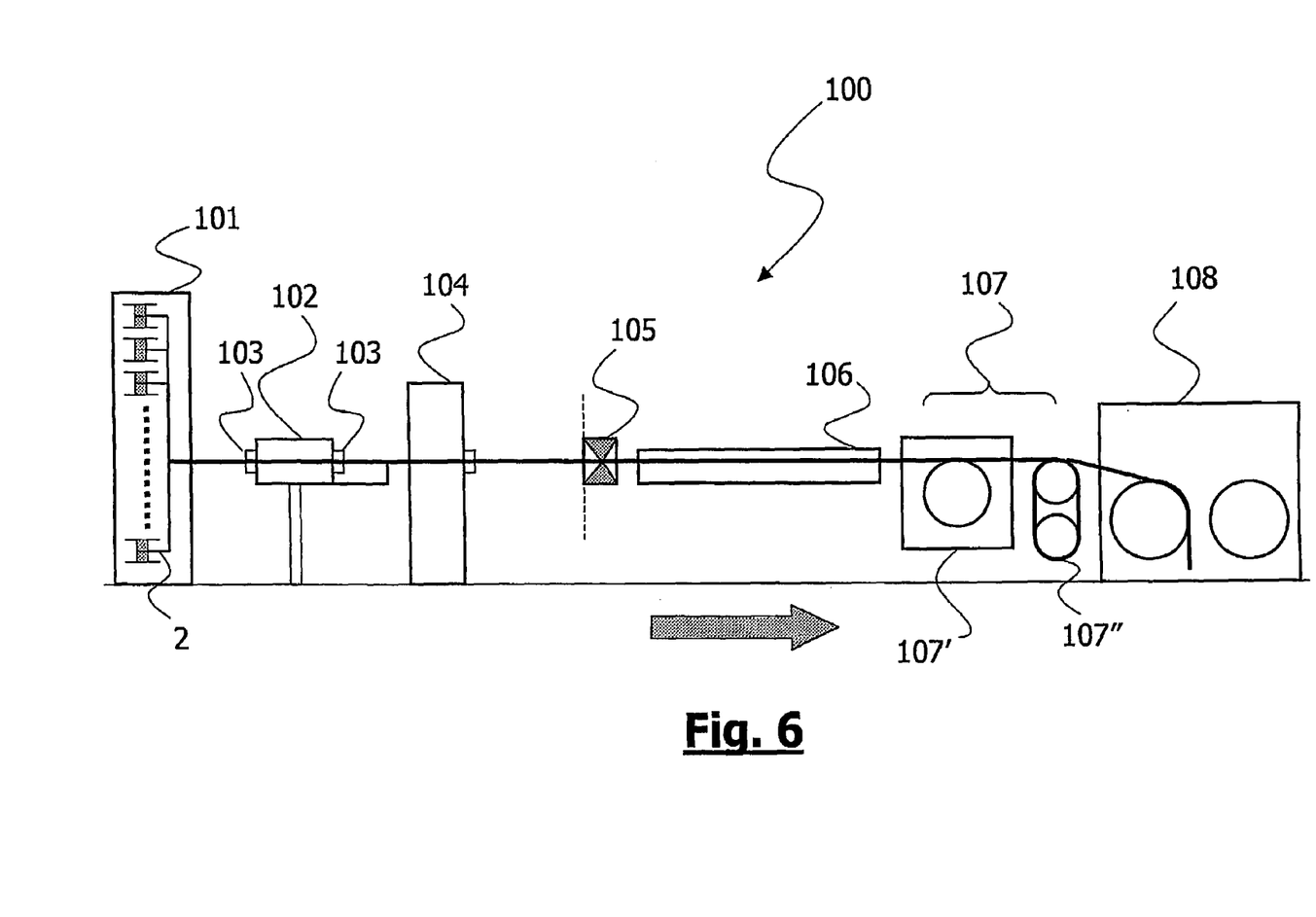
FIG. 6 diagrammatically shows a layout of an apparatus according to the present invention for manufacturing of dry microbundles (i.e. microbundles not filled with a grease-like material) to be used in an optical cable according to the present invention.

In FIG. 6 a layout of the essential parts of an apparatus according to the present invention for manufacturing of dry microbundles to be used in an optical cable according to the present invention is shown. The operation or working direction is from left to right. The apparatus 100 of FIG. 6 comprises:

A pay-off section 101 where a number (in the present embodiment, twelve) of optical fibers 2 are unwound from respective reels and fed to the next section in a first spatial arrangement. Advantageously, the reels may be aligned, for example vertically, to feed the fibers on a same plane. The unwinding step is preferably carried out at a controlled back-tension. The controlled back-tension is obtained by any known pneumatic, mechanical or electrical system. Such a system has not been shown in FIG. 6.

A chalk turntable section 102 for applying talc, an hydro-expanding powder or a mixture thereof.

A lay plate 103 for properly rearranging the optical fibers 2 from the first spatial arrangement into a second spatial arrangement. For a twelve-fibers microbundle, a proper second spatial arrangement comprises three central optical fibers and nine further optical fibers around them, but any other different configuration could be provided. Accordingly, the holed lay plate 103 may have three central holes and nine external holes, with the centers evenly distributed on two concentric circles. Advantageously, further lay plates (not shown) similar to lay plate 103 may be provided aligned with lay plate 103. For example, a first lay plate may be positioned at the entrance of the chalk turntable section 102 and a second lay plate at the exit thereof.

A fiber oscillator device 104 for oscillating the properly arranged optical fibers 2. The fiber oscillator device 104 preferably comprises a rotating holed plate with the same hole arrangement of the lay plate 103. The distance between the holed lay plate 103 and the fiber oscillator device 104 is such that the fibers do not contact each other between plate 103 and device 104 when the rotating plate is at the maximum rotation angle.

An extrusion section comprising an extrusion head 105, wherein a microsheath is continuously extruded around the bundle of oscillated optical fibers, thus forming a microbundle 6.

A cooling through 106 for providing a controlled cooling of the extruded microbundle. Possibly, such a cooling through comprises a number (for instance three) of cooling throughs.

A traction section 107 for pulling the cooled microbundle, preferably comprising a capstan 107*a* and a tension control device 107*b*, such as a "dancer".

A dual (or, possibly, single) take-up stand section 108 for reeling the manufactured microbundle on a proper reel (not shown).

Figure 7:
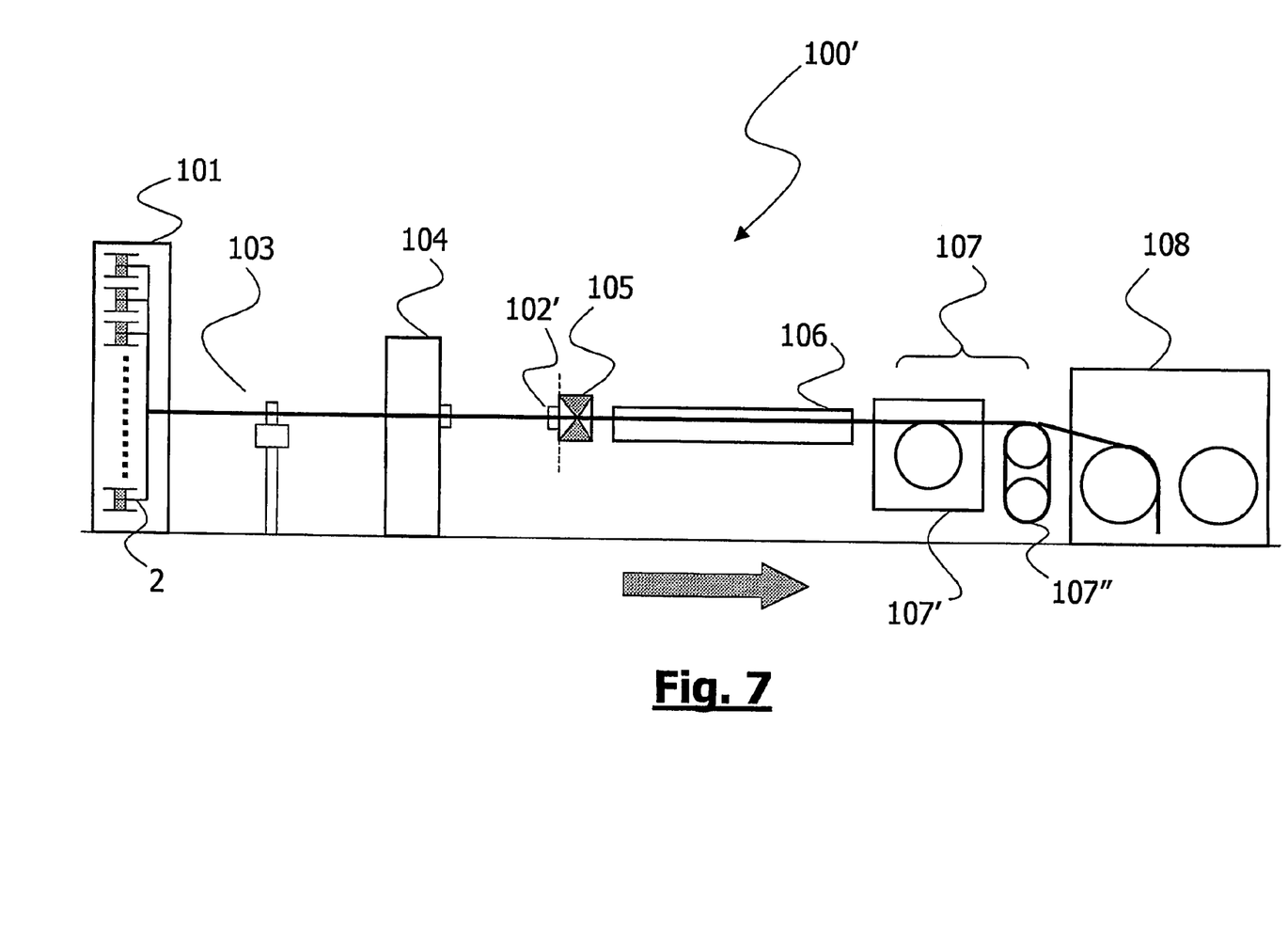
FIG. 7 diagrammatically shows a layout of an apparatus according to the present invention for manufacturing of oil-filled microbundles to be used in an optical cable according to the present invention.

The apparatus of FIG. 7 is similar to the apparatus of FIG. 6 but it is designed for manufacturing oil-filled microbundles to be used in an optical cable according to the present invention. With respect to apparatus 100, apparatus 100' does not comprise the chalk turntable section 102 for applying talc or an hydro-expanding powder, but it comprises an oil applicator 102' which is placed just before the extrusion head 105. Through the applicator 102' a controlled amount of silicon oil could be applied.

The fiber oscillator 104 is designed to impart to the optical fibers a controlled rotation of the S-Z type. A preferred embodiment of the fiber oscillator 104 comprises a fixed support structure and a motor-driven rotating member (oscillating plate) that is mounted on the support structure. The rotating member has an axis of rotation substantially aligned with the working direction. The rotating member rotates, in a continuous manner, clockwise for a certain angle and counter-clockwise for the same angle. As the optical fibers continue to move in the working direction, a S-Z trajectory of the optical fibers is obtained. The preferred rotation angle is in the angle range 280°–330°, more preferably 300°–330°. In any case, the rotation angle should be higher than 180° but lower than 360°.

As previously stated, feeding the optical fibers 2 into the extrusion head 105 in a stable spatial geometry helps to reduce the amount of localized fiber cross over. This is the reason why a lay plate 103 with a proper hole arrangement (for example 3 central holes and 9 external holes to sheathing 12 fibers) is used. Of course it is highly important that the fibers arrive in this configuration in the point of sheath application. To guarantee this, the lay plate 103 must be as close as possible to the extrusion head 105 (in order to reduce any fiber vibration that can disturb the proper geometry distribution). Additionally the optical fibers must not interfere with the walls of the extrusion head 105 in order to avoid any random changing in geometry fiber disposition; this require a good centering and a small direction angle of fibers (and therefore a lay plate of dimensions comparable with that of the extrusion head).

The microbundle manufacturing lines according to FIG. 6 or 7 allow producing microbundles 6 wherein the optical fibers have substantially the same length.

Before reaching the take up section 108, the microbundle 6 transits on the capstan pulley. The capstan generates the congruency point between optical fibers and the microsheath. In case a caterpillar is used instead of a capstan, the congruency point would shift on the take up bobbin. In general, the congruence point is on the cylindrical surface wherein the microbundle is first wound. If the optical fibers were not oscillated, some optical fibers would arrive to the congruence point (capstan or bobbin) closer to the cylindrical surface than other optical fibers.

It has been realized by the Applicant that a good fiber oscillation equalizes the optical fiber length because a fiber of an external layer arrives at congruency point periodically in the bottom and on the top of the bundle. The efficiency of oscillation increase with the rotation angle kept by the fibers inside the microsheath, just at congruency point.

The Applicant has moreover observed that, in order to achieve and maintain an equalized fiber length, it is important to have a good control of the optical fiber and microbundle tension. If a microbundle 6 is produced in the above-mentioned way, but the optical fibers 2 arrive at congruency point with different tensions, different fiber length will be detected at releasing of fiber tension. If the microbundle tension is not uniform while the microbundle is being manufactured, a different length of all fibers against their microsheath will be generated. In other words, all optical fibers could be compressed in a certain position and tensioned in a different one.

In addition to a good control of pay off and take up tensions, any extra tension must be minimized. Optical fibers must avoid any occasionally interference with each other: pins or other devices (not shown) to run the optical fibers in separate way could be installed on the pay off stand to guarantee this condition. In case an extra tension is induced on the optical fibers (for instance by friction on supports), it is important that the same amount of extra tension is generated on all the fibers. Lay plates at the chalk turntable instead of pins in planar configuration absolve also to this requirement. In effect, if the fibers arrive in planar configuration and sharply change on to cylindrical spatial disposition, the fibers with higher change of direction are subjected to higher tension. For this reason, it is advisable to arrange the fibers in a circular arrangement.

Figure 8:
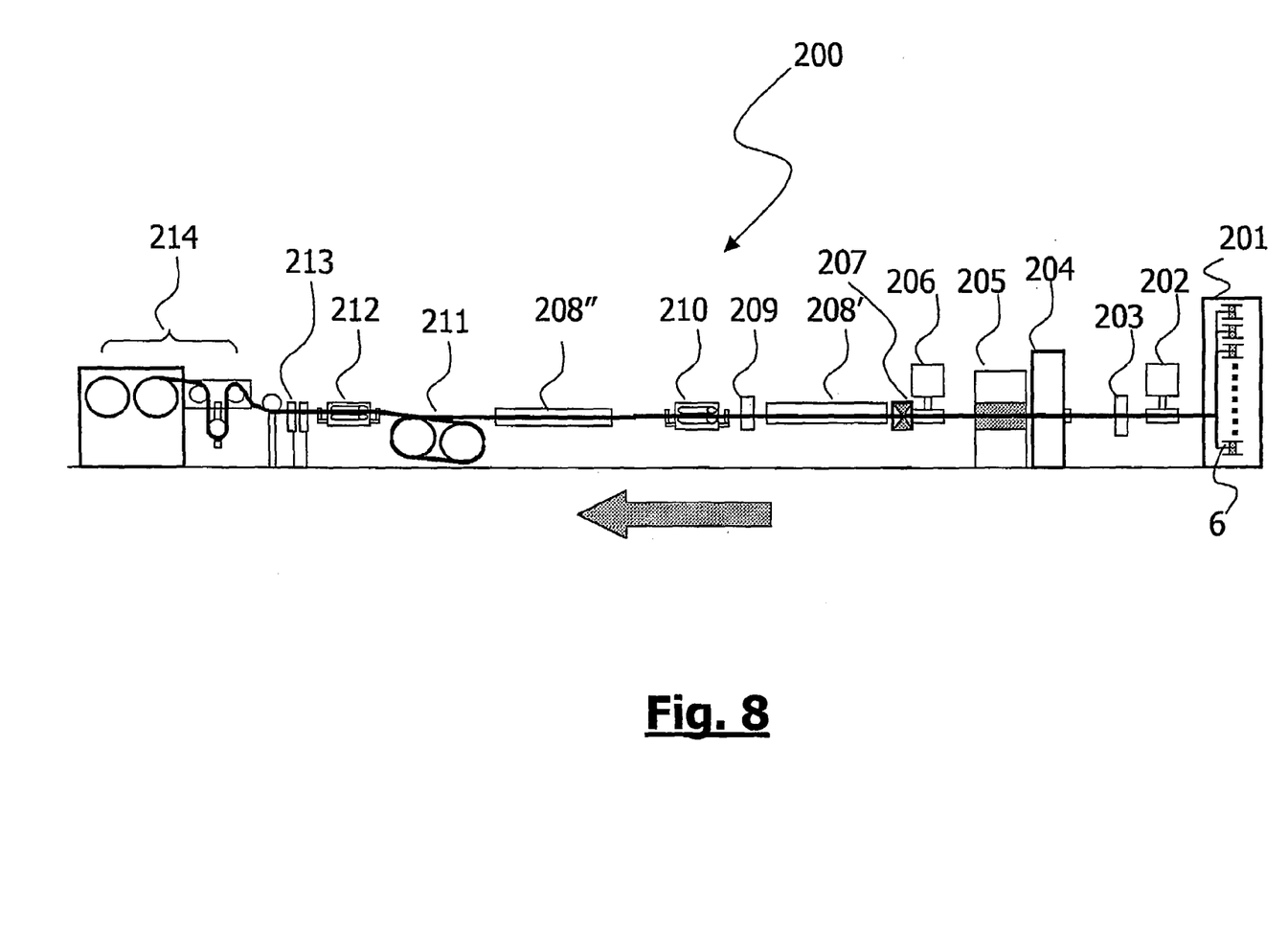
FIG. 8 diagrammatically shows a layout of an apparatus according to the present invention for properly arranging a plurality of microbundles, thus manufacturing an optical cable according to the present invention.

With reference to FIG. 8, the main parts of the apparatus for manufacturing an inner tube 4, containing a number of microbundles 6 as obtainable by the manufacturing line 6 or 7, will be disclosed.

In FIG. 8, the working direction is from right to left. The manufacturing apparatus 200 of FIG. 8 for producing an inner tube 4 containing a plurality of properly twisted microbundles 6 comprises:

A pay off stand section 201 where a number (for instance 12) of microbundles 6 is unwound from respective reels.

A first talc unit 202 for applying talc or the like (for instance an hydro-expanding powder material) to the unwound microbundles.

At least one holed lay plate 203 for properly arranging the microbundles in a desired configuration.

An oscillator device 204 for twisting the microbundles 6 so that they will assume a S-Z (open helix) trajectory.

Optionally, a binder section 205, for binding the microbundles in order to form a bundle of microbundles. As said above, the binding step could be profitably carried out by winding, according to a closed helix trajectory, a narrow binding ribbon (or belt) around the microbundles. Any other means for generating a bundle of microbundles could be devised as gluing, thermal bounding, etc.

A second talc applicator 206 for applying talc or the like (for instance an hydro-expanding powder material or any mixture thereof) to the bound bundle of microbundles, just before the extruding step takes place.

An extruder head 207 for extruding an inner tube 4 around the bundle of microbundles 6.

A cooling through 208 for providing a proper cooling after the extrusion step has took place. Preferably, the cooling through 208 comprises a first cooling through 208' and a second cooling through 208".

A diameter gauge section 209, arranged after the first cooling through 208', for controlling the external diameter and the thickness of the extruded inner tube 4 after a first cooling step; a software allows deriving the corresponding inner diameter.

Optionally, an intermediate traction device 210, such as a mid-caterpillar, for properly regulating the length of the microbundles with respect to the inner tube, is provided. The intermediate traction device 210 is followed by the second cooling through 208".

A capstan device 211 preferably operating at a constant speed and being the master of the manufacturing line.

A further caterpillar 212 for set up purposes; such a further caterpillar operating as a pulling device in order to always assure a good adhesion between inner tube and capstan.

Optionally, an OD and defect gauge section 213 for the final control of the inner tube diameter.

A final take up (or winding) device 214, for instance a dual take up stand for winding the final product.

For clarity reasons, FIG. 8 does not show further known elements of an apparatus for manufacturing a microbundle optical cable, such as the sections where the outer sheath is applied, where ripcords are inserted, where reinforcing rods are arranged and where a wrapping tape is added. Anyway, it should be understood that all these elements are present in the apparatus according to the present invention or the corresponding steps are carried out separately.

The same principles previously discussed regarding the fibers arrangement at the extrusion head are valid also in connection with the manufacturing of inner tubes (containing microbundles of optical fibers) according to the apparatus of FIG. 8. In particular, it is highly desirable to put the microbundles inside the extrusion head in a stable spatial geometry in order to reduce the amount of microbundle cross-over.

Accordingly, at least a lay plate 203 with an optimized arrangement of the holes should be used. For instance, to make a 12-bundles inner tube, a plate with 3 central holes and 9 external holes on a circumference of 18 mm is used. This device strongly reduces the number of bundle cross-over in the inner tube 4 as it is placed close to the extrusion head. Advantageously, crossovers may be eliminated by binding the bundles just after the lay plate. In this case lay plate and binding head can be placed both rather far from the extrusion head.

The better performances are obtained when the tension of the microbundles 6 and of the inner tube 4 are highly controlled and any extra tension has been minimized. Furthermore, the same extra tension on all bundles should be applied.

As for the manufacturing of microbundles, the best results are achieved with a rotation of about 360°. However, a rotation of 360° of a single lay plate may induce a periodical friction of the bundles on themselves and thus extra tension, and consequently bundle ripples are generated. A double rotating plate system, comprising a first and a second rotating plates (the second being closer to the extrusion head) wherein the first rotates at a speed that is half of that of the second, may advantageously be used to induce on the bundles a rotation of 360° without bundle touching.

As variable extra tensions are related to the rotation angle in the unit length, it has been found that the maximum angle without ripples production is 210°/m. However, if the bundles are lashed, no ripples are produced because of increased axial stiffness of the plurality of bundles.

A good microbundle and inner tube tension control is intended to be ±5% around nominal value.

Microbundles must avoid any occasionally interference with each other: pins or other devices to drive the bundles in separate way could be installed on the pay off stand.

Lay plates at the chalk turntable instead of pins in planar configuration help to maintain the same extra tension on all the microbundles.

To create a predetermined congruence point between microbundles 6 and inner tube 4 an about 1000 mm capstan with some inner tube wraps is used. The minimum number of wraps can be evaluated by a pull out test: the wraps must avoid any slippage between tube and bundles at the bundles back tension.

The twelve-microbundle cable is produced with 100 g of back tension for each microbundle, so the total back tension is 1200 g (100 g×12 bundles). The force to pull out the microbundles from the inner tube, with 1 wrap on a 1000 mm drum, is 1800 g (borderline); more than 15 Kg are required to pull it out if there are 2 wraps. So, on production of 12-bundle cable, at least 2 wraps are required. This condition could be not satisfied if the process parameters are changed (size, material, number of bundle, size, material of tube, size of idle pulley). The congruence point affects the microbundle length in the tube.

The invention allows producing microbundles with a difference of fiber length of 0.03%. These results are achievable by oscillating the fibers with a lay length lower than about 2 m and using a small rotating lay plate located at a distance preferably lower than about 1.0 m from the extrusion head and a fiber guide member placed before the fiber oscillating device. Additionally, any possibility of extra tension on the fibers must be removed and the disposition of the holes in both the fixed and oscillating lay plates must be optimized to the number of the fibers.

The invention allows producing optical cables with a difference of microbundle length of about 0.15%. These results are achievable by oscillating the microbundles with a lay length preferably lower than about 6 m, using a lay plate located at a distance lower than about 200 mm from the binding head, and forcing the congruence between microbundles and inner tube always in the same position, before the take up bobbin. For this reason, the inner tube must be wounded an opportune number of turns (this depends on the dimension of tube and bundle, on the compound used, on the quantity of talc filled in the tube, on the number of bundles and their back tension, on the size of the wheel). As an example, 2 turns on 1000 mm capstan wheel are enough.

EXAMPLES

Before testing the technique of the present invention, the Applicant has estimated the fiber length difference that would result by winding on a capstan a microbundle having straight fibers (i.e. not SZ stranded). By simple calculations it is possible to demonstrate that a microbundle with internal diameter of 1.1 mm and straight fibers, wound onto the pulley of a capstan of 320 mm of diameter, shows a length difference of about 0.3% between the fiber that is closer to the pulley surface and the fiber that is more distant to it.

The Applicant has then performed some experiments in the following process conditions, using the manufacturing line 100 (with three cooling through 106) for manufacturing a microbundle 6:

Line speed: 140 m/min;
Fiber back tension: 50±10 g;
Lay plate: 3 central holes and 9 external holes on a circumference of 7.5 mm of diameter;
Extrusion head tooling: 1.9 mm (tip)–2.25 mm (die);
Water temperature in the cooling through: 40° C. in the $1^{st}$ cooling through, 15° C. in the $2^{nd}$ and $3^{rd}$ cooling through;
Number of wraps of the fiber around the capstan: 3;
Take-up tension: 220±50 g;
Capstan diameter: 320 mm;

The Applicant has realized that the following parameters are particularly important for providing a cable with an equalized/controlled fiber length: the fiber lay length, the distance between the lay plate 103 and the extrusion head 105 and the proper fiber arrangement before oscillating them. Several iterative tests have been performed, using the measure methods explained below, for evaluating the influence of each single parameter.

In a first step, the Applicant has evaluated the influence of the fiber lay length, keeping the distance between rotating plate and extrusion head at a fixed value, set at 280 mm.

Table 1 below shows the maximum difference of fiber length in a microbundle by changing the nominal lay length of fiber strand (a fiber lay length of "∞" means optical fibers that are not oscillated during the trials) and by considering a span of microbundle of 1000 m and a span of microbundle of 7 m. The measurement techniques used for the 1000 m and the 7 m spans are different and will be described at the end of this experimental section.

TABLE 1

| Fiber lay length | 1.0 m | 2.0 m | 4.0 m | 6.5 m | ∞ |
|---|---|---|---|---|---|
| Measure on 1000 m | 0.065% | 0.070% | 0.148% | 0.200% | 0.310% |
| Measure on 7 m | 0.060% | 0.063% | 0.237% | 0.281% | 0.350% |

It was thus realized that good results were obtained when the fiber lay length was ≦4.0 m, preferably ≦2.0 m and more preferably about 1.0 m.

In a second step, the Applicant has evaluated the influence of the change of the distance between rotating plate and extrusion head, keeping the fiber lay length at a fixed value of 2.0 m.

Table 2 below shows the maximum difference of fiber length in microbundle by changing the distance of rotating plate from extrusion head.

TABLE 2

| Distance of rotating plate from extrusion head | 280 mm | 550 mm | 1470 mm |
|---|---|---|---|
| Measure on 1000 m | 0.070% | 0.032% | 0.095% |
| Measure on 7 m | 0.063% | 0.010% | 0.178% |

The distance of 280 mm was, in the manufacturing plant that was used for test purposes, the minimum possible distance in view of the space occupied by the various apparatus. In any case, surprisingly, the Applicant has realized that the rotating plate should be neither too close to the extrusion head nor too far from it. An intermediate distance (550 mm) gave the best results. A reduced distance resulted in sharp angles, that are undesirable; a long distance resulted in fibers not properly arranged.

In a third step, the Applicant has evaluated the influence of the lay plate 103, conveniently placed at the chalk turntable 102 in this experiment. In view of the above results, the test was carried out with a lay length of 2 m and with a distance between the rotating plate and the extrusion head equal to 550 mm.

Table 3 shows the maximum difference of fiber length in microbundles when the lay plate is present (arid advantageously placed at the chalk turntable's entry) and when it is absent (free entry at chalk turntable).

TABLE 3

| Condition | Lay plate at chalk turntable | Free entry at chalk turntable |
| --- | --- | --- |
| Measure on 1000 m | 0.032% | 0.098% |
| Measure on 7 m | 0.010% | 0.052% |

It can be appreciated that the presence of the lay plate allows to sensibly reduce the fiber length difference. It has to be remarked that the lay plate may also be spaced with respect to the chalk turntable, still providing comparable advantages. It has also to be remarked that a different number of aligned lay plates may be advantageously be used, such as two or more.

The Applicant has then performed some other experiments in the following process conditions, using the manufacturing line 200 for manufacturing an inner tube 4:

Line speed: 45 m/min;
Fiber back tension: 100±10 g;
Lay plate: 3 central holes and 9 external holes on a circumference of 18 mm of diameter;
Talc rate: 30 g/min;
Extrusion tooling: 9.4 mm (tip) and 12.8 mm (die);
Calibration tool: 8.9 mm;
Vacuum: 355 mb;
Extruder temperature profile: Screw 170-200-200-200° C.; Head 200-200-200-200° C.;
Water temperature: 15° C. in both first and second cooling through;
Mid Caterpillar: not operating;
Number of wraps around capstan: 4;
Take up tension: 3.5±0.5 Kg.

The Applicant has in particular evaluated the influence of microbundle oscillation. The measure was made on a cable span of 7 m.

Table 4 below shows how the microbundle lay length affects the maximum length difference of microbundles. A bundle lay length of "∞" means no oscillation during these trials. The microbundles were not bound.

TABLE 4

| Bundle lay length | 1 m | 3 m | 5 m | ∞ |
| --- | --- | --- | --- | --- |
| Not bound | 0.18% | 0.20% | 0.30% | 0.40% |
| Bound | 0.13% | 0.15% | 0.28% | — |

It can be appreciated that the microbundle lay length shall be preferably lower than 5 m, more preferably lower than 3 m.

In the following, the different techniques used for measuring the fiber length difference in the 7 m span and the 1000 m span of Tables 1, 2 and 3 are described.

The first measurement used for the 7 m span is a destructive technique made by a manual meter bar. A cable length of 70–100 m was unwound from a bobbin and was laid in a rectilinear shape. A clamp was blocked at a distance of at least 50 m from a free end. The clamp was used in order to avoid any sliding movement of the optical fibers with respect to the other parts of the cable. It was placed at such a distance from the free end in order to avoid the effects of possible heading phenomena, namely movements of the fibers due to lack of congruence. In other words, the cable could have compressed or tensioned optical fibers but, at unclamped ends, the optical fibers would be free to arrange themselves according to the minimum energy configuration. A further clamp was blocked at a proper distance (7–10 m) from the first clamp. Such a second clamp was blocked rather far from the bobbin winding (at least about 10 m) in order to avoid fiber length apparent variations due to the non rectilinear geometry (the inner fiber is compressed while the outer fiber is stretched). A cable span of 7 m between the two clamps was cut. Such a cable span was laid and length measured. Afterwards, the single fibers of the cable span under examination were taken, were straighted and the correspondent length were measured.

The second measurement used for the 1000 m span is a non-destructive measurement making use of the electronic measurement instrument EG&G OPTICAL FIBER MEASUREMENT SYSTEM 300 SERIES. The measure was carried out on the whole cable wound on a bobbin. The two ends of the cable were cut sharply. Respective end lengths of about 50 cm were stripped in order to leave the fibers accessible. The two ends of each fiber were introduced in the proper sockets of the instrument. The instrument software (CD300) processed the impulse propagation delays for determining the length of the optical path, upon the refraction index (related to the used fibers) parameter was introduced. The optical path length (L) was calculated by the known formula:

$$L = t \cdot c / n(\lambda)$$

where:
$\lambda$: wavelength at which the measurement is carried out (typically, 1310 nm or 1550 nm);
t: measure impulse delay;
$n(\lambda)$: refraction index of the fiber at the wavelength that is used for the measurement;
c: speed of light in vacuum condition Finally, a percentage difference of the various fiber lengths was calculated, namely $100 \cdot (L_{max} - L_{min})/L_{average}$.

The main advantage of an optical cable according to the present invention is that it shows a highly controlled fiber length resulting in an extremely stable optical cable (for instance against temperature changes) with low optical attenuation with respect to the known optical cables. A further advantage is that its whole diameter is considerably reduced in comparison with similar optical cables. A still further advantage is that the optical fibers can be easily stripped by the installer also without using any tool.

There have thus been shown and described a novel telecommunication optical cable, a novel manufacturing apparatus and a novel manufacturing method which fulfill all the objects and advantages sought therefore. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the scope of the invention are deemed to be covered by the invention which is limited only by the claims which follow.

The invention claimed is;
1. A telecommunication optical cable comprising:
a plurality of microbundles, each microbundle comprising a plurality of optical fibers and a microsheath loosely containing said plurality of optical fibers; and
a tubular member containing said plurality of microbundles,
said plurality of optical fibers being stranded according to an open helix trajectory.

2. The telecommunication optical cable according to claim 1, wherein the microbundles are stranded according to an open helix trajectory.

3. The telecommunication optical cable according to claim 1 or 2, further comprising a binder for binding together the microbundles.

4. The telecommunication optical cable according to claim 3, wherein the binder comprises at least a tape wound around the microbundles.

5. The telecommunication optical cable according to claim 1, wherein the optical fiber open helix trajectory has a lay length, the fiber lay length being ≦ about 4.0 m.

6. The telecommunication optical cable according to claim 5, wherein the optical fiber open helix trajectory has a lay length, the fiber lay length being ≦ about 2.0 m.

7. The telecommunication optical cable according to claim 1, wherein each microsheath is made of a material selected from the group of:
PVC, ethylene/vinyl acetate copolymer, polyethylene;
a mixture of PVC, ethylene/vinyl acetate copolymer or polyethylene with an inorganic filler;
any mixture of PVC, ethylene/vinyl acetate copolymer and polyethylene; and
any mixture of PVC, ethylene/vinyl acetate copolymer and polyethylene, with the addition of an inorganic filler.

8. The telecommunication optical cable according to claim 1 or 2, wherein at least one of said microbundles comprises twelve optical fibers and the corresponding microsheath has an inner diameter between about 1 mm and 1.2 mm and an outer diameter between about 1.3 mm and 1.5 mm.

9. The telecommunication optical cable according to claim 1, wherein at least one of said microsheaths has a thickness between about 0.05 mm and 0.3 mm.

10. The telecommunication optical cable according to claim 1, wherein the tubular member is made of a material selected from the group of medium density polyethylene, high density polyethylene, polypropylene, and any mixtures thereof.

11. The telecommunication optical cable according to claim 1, further comprising an outer sheath surrounding said tubular member.

12. The telecommunication optical cable according to claim 1, wherein said cable comprises at least a peripheral reinforcing member.

13. The telecommunication optical cable according to claim 1, wherein the maximum difference of length between the optical fibers within each of said microbundles is lower than about 0.1%.

14. An apparatus for manufacturing a telecommunication optical cable, comprising:
an optical fiber pay-off stand suitable for unwinding a plurality of optical fibers;
an extrusion device for extruding, around said plurality of optical fibers, a microsheath loosely containing said plurality of optical fibers to form a microbundle;
a fiber oscillating device between the fiber pay-off stand and the extrusion device for SZ oscillating the fibers before entrance into the extrusion device; and
a fiber guide member placed before the fiber oscillating device for properly arranging the optical fibers in a predetermined configuration.

15. An apparatus according to claim 14, further comprising:
a microbundle pay-off stand suitable for unwinding a plurality of microbundles formed as said microbundle;
a further extrusion device for extruding around said plurality of microbundles, a tubular member containing said plurality of microbundles; and
a microbundle oscillating device positioned between the microbundle pay-off stand and the further extrusion device, for SZ oscillating the microbundles before entrance into the further extrusion device.

16. The apparatus according to claim 15, further comprising a binder section for binding the microbundles in order to form a bundle of microbundles.

17. The apparatus according to claim 16, wherein the binder section comprises a stranding device for stranding a ribbon around said microbundles.

18. The apparatus according to claim 14, wherein said fiber guide member is a holed lay plate.

19. The apparatus according to claim 15, further comprising a holed lay plate for properly arranging the microbundles in a predetermined configuration, the holed lay plate being placed before the microbundles oscillating device.

20. The apparatus according to claim 14, wherein said extrusion device comprises an extrusion head, the distance between the fiber oscillating device and the extrusion head being between about 280 mm and 550 mm.

21. The apparatus according to claim 14 or 15, wherein both the fiber and microbundle oscillating devices comprise a plate with holes having hole centers on at least two concentric circles.

22. A method for manufacturing a telecommunication optical cable, comprising:
advancing a plurality of optical fibers in a first spatial arrangement;
rearranging the plurality of optical fibers from the first spatial arrangement into a second spatial arrangement;
stranding SZ the plurality of optical fibers in the second spatial arrangement; and
extruding a microsheath around the SZ stranded optical fibers so as to form a loose microbundle.

23. The method according to claim 22, further comprising the step of stranding SZ the loose microbundle with at least a further microbundle.

24. The method according to claim 23, further comprising binding together the microbundles and the at least a further microbundle in order to form a bundle of microbundles.

25. The method according to claim 22, wherein the step of SZ stranding the optical fibers comprises inverting the stranding direction with a pitch lower than about 4.0 m.

26. The method according to claim 25, wherein said pitch is lower than about 2.0 m.

27. The method according to claim 22 or 23, wherein the step of SZ stranding the optical fibers comprises rotating a fiber guiding holed pate by an angle in the range between 280° and 330°.

* * * * *

UNITED STATES PATENT AND TRADEMARK OFFICE
CERTIFICATE OF CORRECTION

| | | |
|---|---|---|
| PATENT NO. | : 7,200,307 B2 | Page 1 of 1 |
| APPLICATION NO. | : 10/537337 | |
| DATED | : April 3, 2007 | |
| INVENTOR(S) | : Bau' et al. | |

It is certified that error appears in the above-identified patent and that said Letters Patent is hereby corrected as shown below:

\* On the title page, item (54), line 3, "LENGTH METHOD" should read --LENGTH, METHOD--.

In claim 27, column 18, line 60, "pate" should read --plate--.

Signed and Sealed this

Eighteenth Day of December, 2007

JON W. DUDAS
*Director of the United States Patent and Trademark Office*